April 2, 1935.  C. W. HALL  1,996,200
ROTARY VALVE ENGINE
Filed Feb. 17, 1934   3 Sheets-Sheet 1

CHARLES W. HALL

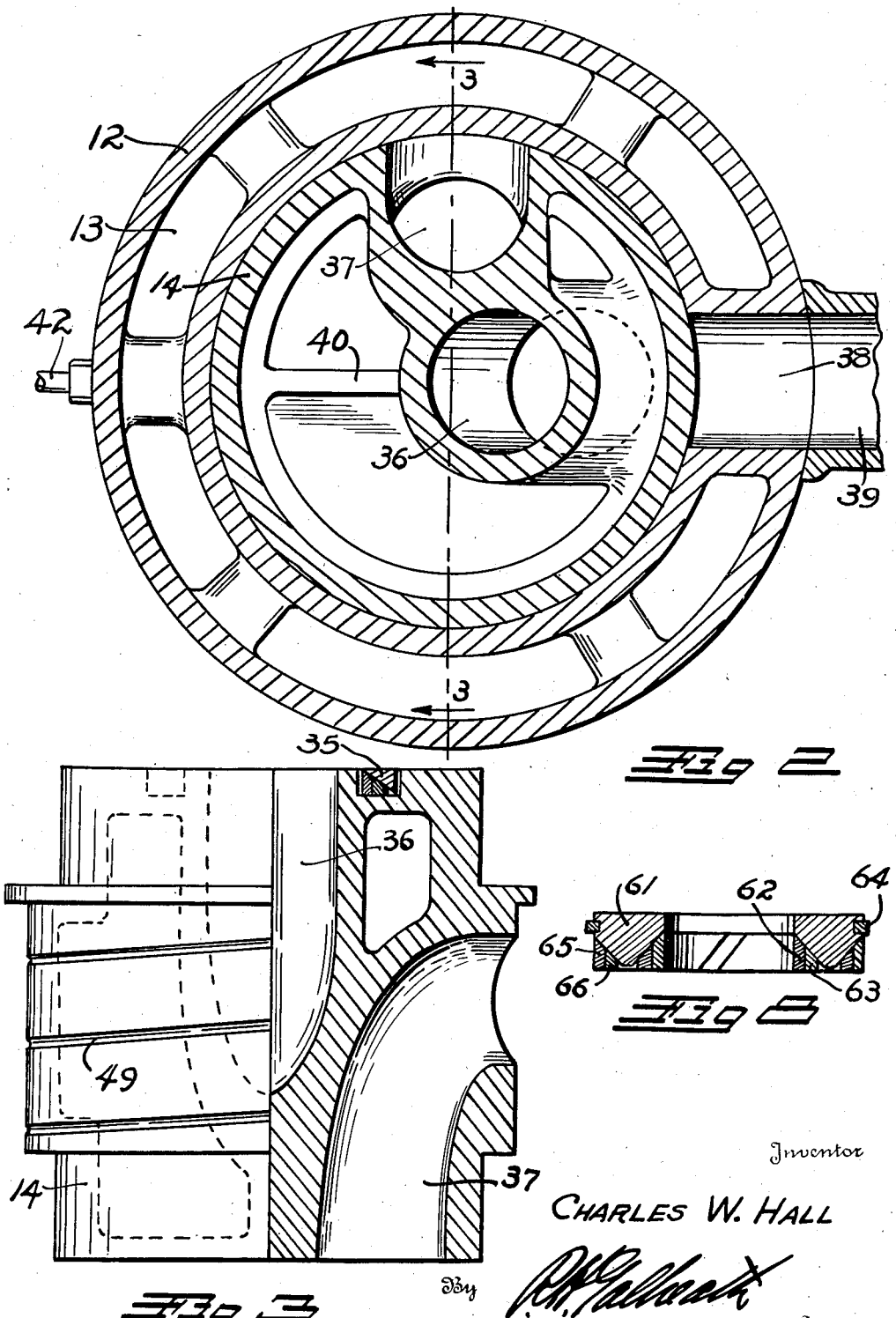

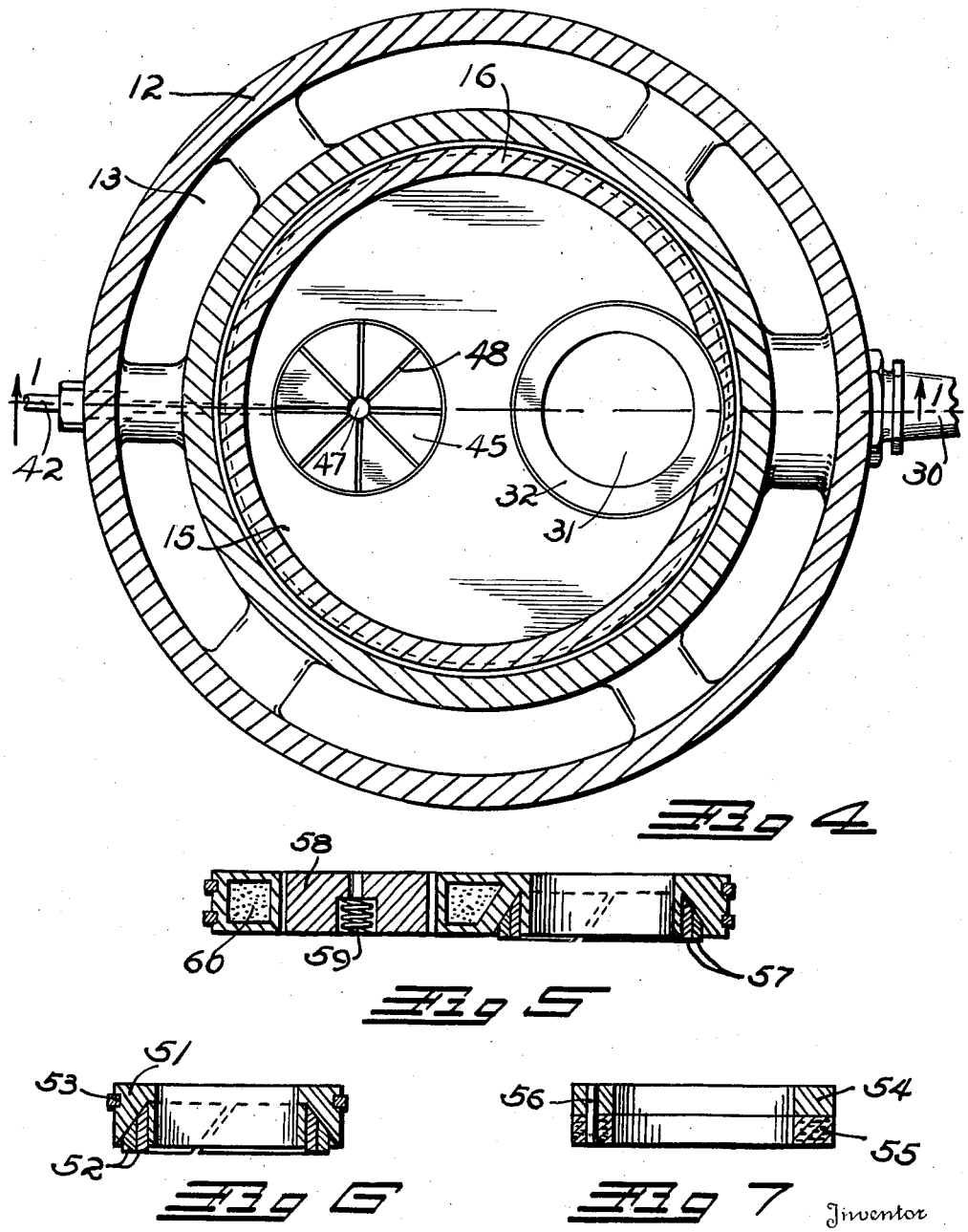

Patented Apr. 2, 1935

1,996,200

UNITED STATES PATENT OFFICE 1,996,200

ROTARY VALVE ENGINE

Charles W. Hall, Denver, Colo., assignor to Hall Rotary Valve Motor Company, Denver, Colo., a corporation of Colorado Application February 17, 1934, Serial No. 711,721

16 Claims. (Cl. 123—190)

This invention relates to a rotary valve for internal combustion engines and has for its principal object the provision of a highly efficient, simple, rotating valve member for controlling the intake and exhaust to a cylinder which will eliminate all reciprocating valve elements, valve springs, etc.

Another object of the invention is to so construct the rotary valve that it will be efficiently sealed against the escape and transfer of gases; will be efficiently lubricated; efficiently cooled; and which will automatically accommodate itself to the natural wear.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings, and throughout the description.

In the drawings:

Fig. 2 is a horizontal section through the valve taken on the line 2—2, Fig. 1.

Fig. 3 is a side elevation partly in section of the valve itself.

Fig. 4 is a horizontal section taken on the line 4—4, Fig. 1, illustrating a face view of the sealing plate.

Fig. 5 is a sectional view through an alternate form of sealing plate.

Fig. 6 is a similar view through an alternate form of lower sealing ring.

Fig. 7 is a similar view through an alternate form of upper sealing ring.

Fig. 8 illustrates still another alternate form of lower sealing ring.

Figure 1:
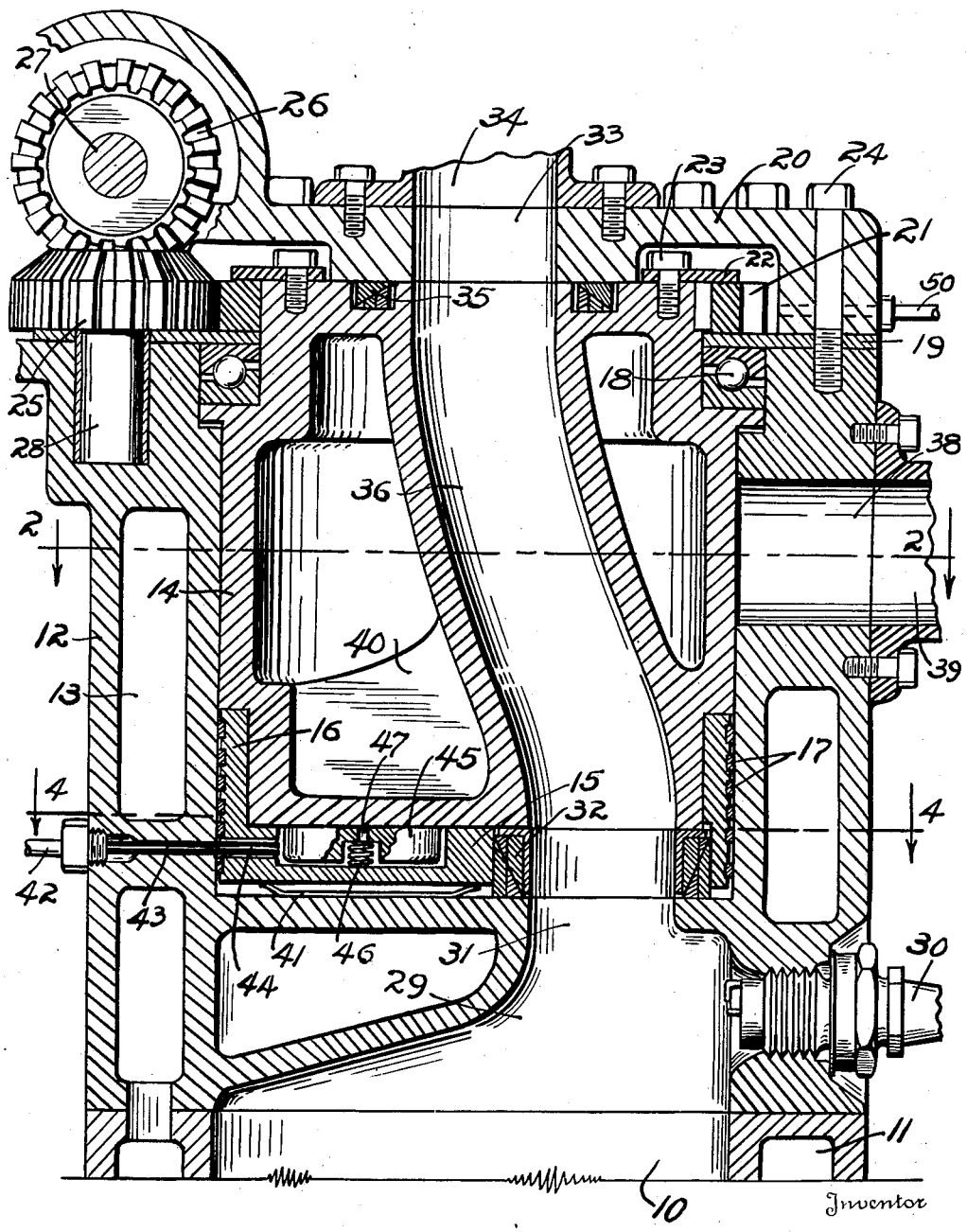
Fig. 1 is a vertical section through a typical cylinder head, illustrating the valve in place thereon, taken on the line 1—1, Fig. 2.

The copending application of the applicant, Serial No. 708,400, filed Jan. 26, 1934, illustrates a rotary valve controlling multiple cylinders. This application illustrates a unit valve for each cylinder.

In Fig. 1 of the drawings, the upper portion of a typical cylinder is illustrated at 10 with its water jacket at 11, and it is to this upper portion of the cylinder that the invention is applied. The invention comprises a cylinder head casing 12 provided with a water jacket 13 which communicates with the water jacket 11 of the cylinder 10. The casing 12 is provided with a cylindrical valve bore, opening through the top of the casing.

A rotary valve 14 fits within the valve bore having a relatively tight running fit therein. A sealing plate 15 is positioned between the bottom of the valve 14 and the bottom of the valve bore. The sealing plate is preferably provided with a peripheral, upstanding flange 16 surrounding a reduced extremity on the lower portion of the valve 14. The flange 16 carries a series of oil seal and heat transfer rings 17.

The valve 14 is provided with a thrust bearing 18 at its top which is preferably held in place by means of a thrust plate 19 positioned between the casing 12 and a cap 20. A ring gear 21 is keyed or otherwise secured about the top of the valve 14 and held in place thereon by means of a retainer ring 22 and suitable cap screws 23. The cap 20 is clamped in place by means of suitable cap screws 24 and is provided with a central exhaust opening 33 communicating with an exhaust pipe 34.

The valve may be rotated in any desired manner. One method of applying the rotation is to provide a spur pinion 25 provided with bevel teeth to mesh with a bevel gear 26 upon a drive shaft 27, which may connect a series of cylinders. The pinion 25 has a stub shaft 28 which rotates in a bearing in the casing 12. The lower portion of the casing 12 contains a combustion chamber 29 provided with the usual spark plug 30. The combustion chamber 29 opens to the valve bore through a single port 31 positioned eccentrically of the axis of the valve 14.

The sealing plate 15 is provided with a port opening immediately over the port 31, in which, a suitable sealing ring 32 is positioned. This ring is of a type which expands axially so as to constantly form a seal between the bottom of the valve bore and the bottom of the valve. An upper sealing ring 35 is positioned in the valve 14 about the central exhaust opening 33. This ring is also axially expansible.

An exhaust passage 36 extends diagonally through the valve 14 from the opening 33 to a position which will register with the port 31, at each revolution of the valve 14. An intake passage 37 is also formed in the valve 13 to also register with the port 31 at each revolution of the valve. The passage 37 extends upwardly and outwardly through the cylindrical wall of the valve 14 to register with an inlet opening 38 in the casing 12. Any suitable intake pipe 39 conducts gas to the intake opening 38. The remainder of the interior of the valve 14 is hollow and may be provided with suitable expansion ribs 40.

In operation, the valve 14 rotates at ½ the crank shaft speed and, when the passage 37 aligns between the intake opening 38 and the port 31, gas is drawn into the cylinder 10. As the piston rises in the cylinder, this passage will close and allow the gas to be compressed for the explosion cycle. As the piston approaches the bottom of the explosion stroke the passage 36 will align between the port 31 and the opening 33, allowing the burnt gas to be exhausted to the exhaust manifold 34 on the exhaust stroke of the engine. The intake passage will then again align for the succeeding cycle.

The sealing plate 15 is constantly held against the bottom of the valve 14 by means of a suitable leaf spring 41 or other suitable expansion device. This pressure constantly holds the valve against its thrust bearing 18. The cylinder pressure also acts to constantly force the valve upwardly against its thrust bearing. All of the thrust is absorbed by the bearing 18 and the fit between the head of the valve 14 and the cap 20 is maintained only as a light running fit. Gas escape at this point is stopped by the upper ring 35.

The valve may be lubricated in any desired manner. A preferred method for lubricating is illustrated, in which, an oil pipe 42 leads through the wall of the casing 10 to an oil tube 43 which extends into the sealing plate 15 and terminates in a button socket in the upper face of the sealing plate 15. A circular oil button 45 is placed in the button socket and is constantly forced against the bottom of the valve by means of a suitable spring 46. The button 45 is provided with a central oil opening 47 which communicates with a series of radial oil grooves 48 on the upper face of the button.

It will be noted that the outer portion of the button is contacting with a more rapidly moving surface on the valve than the inner portion thereof. This causes the frictional contact with the valve to rotate the button, spread the oil or other lubricant evenly over the surface of the valve. The above described differential friction action also causes the sealing ring 32 to rotate in its seat in the plate 15. Thus the ring itself acts also as an oil spreader and this further insures an even wear on all portions of the ring.

The lubricant is carried upwardly along the walls of the valve 14 by a series of helical grooves 49 on the exterior thereof so as to supply oil to the bearing surfaces at the upper portion of the valve. Any excess oil at the top may be carried off through a suitable oil bleeder pipe 50.

The sealing ring illustrated at 32 comprises: an inner shield ring having an L-shaped cross section. Back of the shield ring are four bevelled expanding rings which, owing to their bevel contact surfaces, constantly tend to expand the assembly axially. Another form of sealing ring is illustrated in Fig. 6 in which a main ring 51 is provided with a bevelled bottom groove in which two bevelled expanding, split rings 52 are positioned. As the rings 52 expand, their bevelled contact with the ring 51 will tend to expand the entire assembly axially. This ring is also provided with an oil stop ring 53 about its periphery to stop oil from being drawn from the bottom of the valve bore into the gas passages.

The upper sealing ring 35 illustrated in Fig. 1 consists of an upper solid, bevelled ring, below which, two expanding bevel rings are positioned, which in expanding, tend to increase the height of the ring. Another form for the upper ring is shown in Fig. 7, in which, an upper solid ring 54 is provided with a lower cushion ring 55 of cork or similar material. The two rings are keyed together by means of suitable pins 56. This also provides an axially expanding ring.

An alternate form of sealing plate is illustrated in Fig. 5. This plate does not have the flanges 16, but of course could have them if desired. In this plate, a sealing ring 57 is positioned in a bevel groove formed in the plate itself so that the advantages of the ring of Fig. 6 are obtained without a separate ring construction. The sealing plate of Fig. 5 is illustrated with an oil button 58 which passes entirely through the plate so that its pressure spring 59 will seat against the bottom of the valve bore. This construction could of course be embodied in the plate of Fig. 1 if desired, and it is conceivable that the button 58 could be carried still further downwardly into a socket in the bottom of the valve bore.

The plate of Fig. 5 is formed with a hollow interior which may be filled with a suitable cooling salt or other heat transfer medium as indicated at 60. This feature could also be embodied in the plate of Fig. 1 and the entire hollow interior of the rotary valve 14 could be filled with such a cooling salt or other heat transfer medium to maintain the valve at a practical operating temperature.

In Fig. 8, an alternate form of the sealing ring is illustrated in which a solid ring 61 is provided with a double bevel bottom against which four bevelled rings 62, 63, 65, and 66 engage. The rings 62 and 63 are outwardly expanding rings and the rings 65 and 66 are inwardly expanding rings. The combined effect of the four rings is to increase the axial width of the entire assembly. Pressure in the passage increases the outward pressure of the rings 62 and 63 so as to increase the sealing effect of the assembly. A partial vacuum in the passage, as on the intake stroke, increases the inward pressure on the outer rings 65 and 66 so as to increase the sealing effect in proportion to the vacuum. This increase of sealing effect is also apparent in the ring 32 which functions similarly. It will also be noted that the bevel rings of the ring assembly 32 expand in the ring opening in the plate 15 so as to seal the ring to the plate as well as to the valve. An oil seal ring 64 surrounds the entire assembly to prevent the passage of oil through the sealing plate opening.

While an internal combustion engine having a water jacketed cylinder and head is illustrated it will be understood that the invention applies equally well to engines designed for cooling by air or other means. It will be understood further that while Fig. 1 shows a rotor having its axis in line with that of the cylinder, yet the invention may be applied to designs in which the rotor may occupy other positions relative to the cylinder.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A rotary valve for an internal combustion engine cylinder comprising: a casing positioned on said cylinder, a cylindrical valve bore in said casing; a port communicating between said cylinder and said bore eccentric of the axis thereof; a cap closing said casing and provided with a central exhaust opening, there being a side intake opening communicating through the cylindrical wall of said casing with said valve bore; a cylindrical rotary valve positioned within said bore; a passage extending diagonally between the lateral face of and through said valve from said central exhaust opening to a point to align with said cylinder port; an intake passage extending in said valve from a point in the cylindrical surface of said valve to align with said intake opening to a point on a lateral surface to align with said cylinder port; and means for rotating said valve in synchronism with said engine.

2. A rotary valve for an internal combustion engine cylinder comprising: a casing positioned on said cylinder; a valve bore in said casing; a port communicating between said cylinder and said bore eccentric of the axis thereof; a cap closing said casing and provided with a central exhaust opening, there being a side intake opening communicating through a wall of said casing with said valve bore; a cylindrical rotary valve positioned within said bore; a passage extending diagonally through said valve from said central exhaust opening to a point to align with said cylinder port; an intake passage extending in said valve from points to align with said intake opening and said cylinder port; means for rotating said valve in synchronism with said engine; a sealing plate positioned between said valve and the bottom of said bore, said plate having a port opening in alignment with said cylinder port; and flanges formed on said sealing plate and extending upwardly about said valve.

3. A rotary valve for an internal combustion engine cylinder comprising: a casing positioned on said cylinder; a cylindrical valve bore in said casing; a port communicating between said cylinder and said bore eccentric of the axis thereof; a cap closing said casing and provided with a central exhaust opening, there being a side intake opening communicating through the cylindrical wall of said casing with said valve bore; a cylindrical rotary valve positioned within said bore; an exhaust passage extending diagonally through said valve between the lateral faces thereof; an intake passage extending in said valve from a point on the cylindrical surface to one of the lateral faces; means for rotating said valve in synchronism with said engine; a thrust bearing for absorbing the upward thrust of said valve; and means for sealing said first passage to said exhaust opening.

4. A rotary valve for an internal combustion engine cylinder comprising: a casing positioned on said cylinder; a valve bore in said casing; a port communicating between said cylinder and said bore eccentric of the axis thereof; a cap closing said casing and provided with a central exhaust opening, there being a side intake opening communicating through a wall of said casing with said valve bore; said intake opening being positioned in the cylindrical wall of said bore; a rotary valve fitting into said bore; a first passage extending from a concentric position at the outer transverse face of said valve to an eccentric position in alignment with said port at the inner transverse face of said valve; a second passage extending from an eccentric position on said valve to align through the cylindrical wall with said intake passage.

5. In a rotary valve of the cylindrical type having intake and exhaust passages therethrough; means for sealing said valve to a cylinder port comprising: a sealing plate; means for maintaining said plate against said valve; a sealing ring passing through said plate in alignment with said cylinder port; means for expanding said ring axially to maintain contact between said valve and port; a rotary button exposed through the upper surface of said plate; and means for maintaining said button in contact with said valve.

6. In a rotary valve of the cylindrical type having intake and exhaust passages therethrough; means for sealing said valve to a cylinder port comprising: a sealing plate; means for maintaining said plate against said valve; a sealing ring passing through said plate in alignment with said cylinder port; means for expanding said ring axially to maintain contact between said valve and port; a rotary button exposed through the upper surface of said plate; means for maintaining said button in contact with said valve; and an oil passage for conveying oil to said button, said button being provided with grooves for distributing said oil.

7. In a rotary valve having a sealing plate provided with a port opening: means for sealing said opening comprising: a beveled bottom groove surrounding said port in one face of said plate; and beveled expansion rings positioned in said groove so as to constantly tend to increase the axial width of the entire assembly.

8. In a rotary valve having a sealing plate provided with a port opening; means for sealing said opening comprising: a solid ring positioned in said port opening and provided with a beveled bottom groove; beveled expansion rings positioned in said groove so as to constantly tend to increase the axial width of the entire assembly; and an oil seal ring surrounding said solid ring.

9. A rotary valve for internal combustion engines comprising: a hollow, cylindrical valve member; a first tube extending from an eccentric poistion on one lateral face of said member to a concentric position on the other transverse face thereof; and a second tube extending from an eccentric position on said first lateral face through the cylindrical wall of said member.

10. Means for sealing a rotary valve in a cylindrical valve casing comprising: a sealing plate contacting with a lateral face of said valve; an upstanding flange surrounding said sealing plate and extending about one extremity of said valve.

11. Means for sealing a rotary valve in a cylindrical valve casing comprising: a sealing plate contacting with a lateral face of said valve; an upstanding flange surrounding said sealing plate and extending about one extremity of said valve, said valve extremity being of a reduced diameter to receive said flange; and a series of sealing rings sealing said flange to said casing.

12. Means for sealing a rotary valve in a cylindrical valve casing having a ported, flat end face comprising: a sealing plate positioned between said valve and said flat end face provided with an opening in alignment with the port in said end face; an upstanding flange about said sealing plate and against the cylindrical wall of said casing, said valve being inset to receive said flange; means for urging said plate against said valve; a sealing ring passing completely through said plate in said opening; and means for expanding said ring so that it will be maintained in constant contact with both said valve and said end face.

13. Means for sealing a rotary valve in a cylindrical valve casing having a ported, flat end face comprising: a sealing plate positioned between said valve and said flat end face provided with an opening in alignment with the port in said end face; an upstanding flange about said sealing plate and against the cylindrical wall of said casing, said valve being inset to receive said flange; means for urging said plate against said valve; a sealing ring passing completely through said plate in said opening; and means for expanding said ring so that it will be maintained in constant contact with both said valve and said end face; a circular button inset in one face of said plate; and means for forcing said button into constant contact with said valve.

14. Means for sealing a rotary valve in a cylindrical valve casing having a ported, flat end face comprising: a sealing plate positioned between said valve and said flat end face provided with an opening in alignment with the port in said end face; an upstanding flange about said sealing plate and against the cylindrical wall of said casing, said valve being inset to receive said flange; means for urging said plate against said valve; a sealing ring passing completely through said plate in said opening; means for expanding said ring so that it will be maintained in constant contact with both said valve and said end face; a circular button inset in one face of said plate; means for forcing said button into constant contact with said valve; and means for sealing said flange to the cylindrical wall of said casing.

15. A rotary valve for internal combustion engines comprising: a cylindrical rotary valve; a first passage extending from a concentric position on one lateral face of said valve to an eccentric position on the other face; a second passage extending through said valve from an eccentric position on said lateral valve face to an opening in the cylindrical wall of said valve.

16. Means for lubricating a rotary valve comprising: a rotary button; means for urging said button against said valve; and means for supplying lubricant to the face of said button so that the rotation of said button will spread said lubricant on said valve.

CHARLES W. HALL.